POWER AMPLIFIER FOR REDUCING THIRD-ORDER INTERMODULATION
PRODUCTS IN SINGLE-SIDEBAND SIGNALS
Filed Nov. 15, 1961
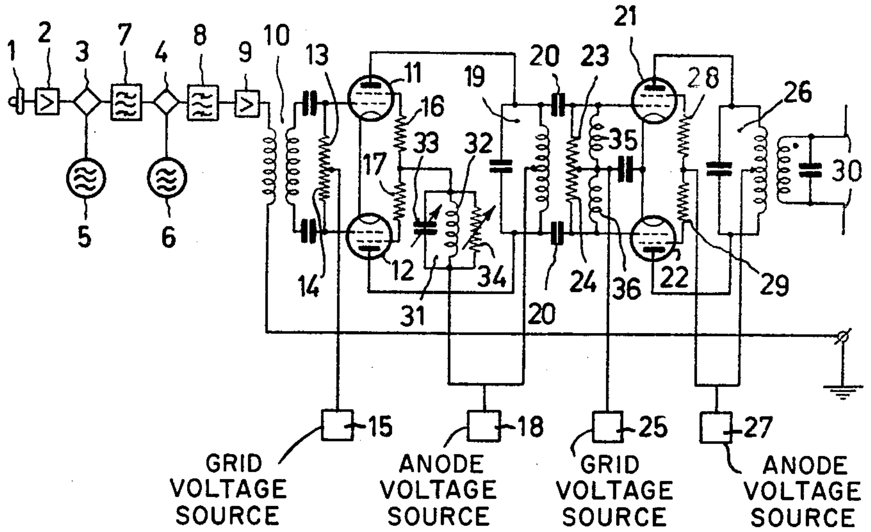
INVENTOR
CORNELIS A. SNIJDERS
BY
Frank R. Trifari
AGENT United States Patent Office 3,213,387

Patented Oct. 19, 1965

3,213,387
POWER AMPLIFIER FOR REDUCING THIRD-ORDER INTERMODULATION PRODUCTS IN SINGLE-SIDEBAND SIGNALS

Cornelis Arie Snijders, Hilversum, Netherlands, assignor to North American Philips Company, Inc., New York, N.Y., a corporation of Delaware Filed Nov. 15, 1961, Ser. No. 152,444
Claims priority, application Netherlands, Nov. 21, 1960, 258,202
6 Claims. (Cl. 330—109)

The invention relates to a power amplifier for single sideband signals in a single sideband transmitter suitable for a power of a few kilowatts, for example. Such single sideband transmitters are successfully equipped with power amplifying stages biased for Class B operation, which may be controlled by means of the grid current.

The construction of such power amplifiers is, in practice attended with difficulties due to the occurrence of third-order intermodulation products of the type $2p-q$ and $2q-p$, which occur with great strength in the single sideband components $p$ and $q$ with the great-control-range of the power amplifier mainly owing to non-linearities of the control-characteristic curve. These third-order intermodulation products, which occur with great intensity in the transmitted frequency band or in the immediate proximity thereof, cannot be suppressed or attenuated by using filter networks. In order to fulfill the requirements of freedom of distortion with such single sideband transmitters, the amplifier is frequently provided with a negative feedback circuit having a high negative feedback factor; owing to this high negative feedback factor this circuit requires particular care in its structure in order to avoid instabilities of the amplifier.

The invention has for its object to obtain an effective suppression of the intermodulation products of the kind referred to above in a different way in single sideband amplifiers of the kind set forth, whereby instabilities are avoided and a simple structure is obtained.

According to the invention, in order to compensate for third-order intermodulation products, a current conveying electrode circuit of the power amplifier is provided with a corrector circuit which includes a selective circuit for selecting the second-order distortion products of the transmitted single sideband signals and a network shifting the phase of these second-order distortion products.

The invention will now be described more fully with reference to the figure, which illustrates a single sideband transmitter comprising a particularly suitable power amplifier according to the invention.

In the single sideband transmitter shown in the figure the signals from a microphone 1 are amplified in a microphone amplifier 2, and are transposed in two successive modulation stages to the transmitted frequency band of 10,000,300–10,006,000 c./s. The modulation stages comprise amplitude modulator 3 and 4 respectively having oscillators 5 and 6 respectively, connected thereto, and output filters 7 and 8 respectively.

The output circuit of the modulation stage 4 is connected to a preamplifier 9 to provide voltage amplification, and preamplifier 9 is connected by way of a transformer 10 to the control-grids of push-pull connected amplifying valves 11, 12 of a transmitter control-stage. The valves 11 and 12 are biased for Class B operation. These amplifying valves 11, 12 are of the tetrode type and their control grids are connected via grid resistors 13, 14 to the negative voltage terminal of a grid voltage source 15. The screen grids of these valves are connected by way of screen-grid resistors 16, 17 to the positive terminal of an anode-voltage source 18. The source 18 also supplies the anode voltage for the amplifying valves 11, 12.

The output voltage of these amplifying valves 11, 12 is obtained from a tuned circuit 19, included in the anode circuit of the amplifying valves and is used for controlling an output amplifying stage by way of coupling capacitors 20. The output amplifying stage comprises two push-pull connected, grid-current-controlled amplifying valves 21, 22 of the tetrode type biased for Class B operation. The control-grids of these valves are connected by way of grid resistors 23, 24 and chokes 35, 36 to the negative terminal of a grid-voltage source 25. The anodes are connected to different ends of an output circuit 26. The anode voltage and the screen-grid voltage for the tetrodes 21, 22 are derived from the positive terminal of an anode-voltage source 27, which is connected to a central tapping of the circuit coil of the output circuit 26 and to screen-grid resistors 28, 29. The amplified single sideband signals are transmitted by an aerial 30, coupled inductively to the output circuit 26.

The operation of the single sideband transmitter shown will now be explained more fully. When the microphone 1 is operated, the microphone signals are supplied, to the modulation stages 3 and 4 for frequency transition to the frequency band of 10,000,300–10,006,000 c./s. to be transmitted. The output of the modulators is amplified in the preamplifier 9, and applied to the power amplifier formed by the control-amplifier 11, 12 and the output amplifier 21, 22. The power amplifier amplifies the single sideband signals up to the desired transmission power in order to transmit the signals via the aerial 30. The transmitter shown may be suitable for example, for a power-output of 10 kw.

It is found that in this device the single sideband signals transmitted by the aerial 30 contain high intensity interfering intermodulation products of the third order of the kind $2p-q$ and $2q-p$. These intermodulation products are mainly due to intermodulation of the single sideband components $p$ and $q$ with the extreme control of the control-amplifying and output amplifying valves 11, 12, 21, 22 respectively owing to non-linearities of the grid-voltage-anode-current characteristic curves. It was found with the transmitting device shown that these interfering intermodulation products occurred with a relative intensity of —28 db or even worse.

In accordance with the invention a considerable reduction of these third-order intermodulation products is obtained by including in a current-conveying electrode circuit of the control-amplifying valves 11, 12 a corrector circuit formed by a selective circuit 31 for the selection of the second-order distortion products $2p$, $2q$, $p+q$ and by a network for shifting the phase of these second-order distortion products. In practice it has been found to be particularly advantageous to include this corrector circuit 31 in the screen-grid circuits of the amplifying valves 11, 12. The two functions of the corrector circuit, i.e. the selection of the second-order distortion products and the phase shift of these distortion products, are combined in a desirable manner in the embodiment shown by using a tuned parallel circuit 31 having a circuit coil 32 and a circuit capacitor 33, which is detuned with respect to these second-order distortion products. In the embodiment shown in which the transmitted single sideband signals are in the frequency band of 10,000,300–10,006,000 c./s., the tuning frequency of the parallel circuit is about 19,000 c./s.

In the illustrated circuit, as a result of the use of the parallel circuit 31, a voltage having frequency components correspond to the second-order distortion products of the transmitted single side-band signals is developed at the screen grids of the valves 10 and 11. This voltage is mixed in the valves with the single sideband signals. Owing to non-linearities of the valve characteristic curves, a mixed voltage having frequency components corresponding to the frequency of the undesirable third-order intermodulation products is produced by the valves. The frequency components in the mixed voltage corresponding to the third order intermodulation products occurring in the transmitted frequency band or in the immediate proximity thereof are selected in the output circuit 19 of the control-amplifier 11, 12 and subsequent to amplification in the output amplifying stage 21, 22, fed to the output circuit 26.

It has been found with this device that by a suitable amplitude and phase adjustment of the voltage at the screen-grids of the control-amplifying valves 11, 12 the frequency components of the mixed voltage corresponding to the third-order intermodulation products have amplitudes equal to and phases opposite to those of the undesirable third-order intermodulation products, so that a compensation of these third-order intermodulation products is obtained. The amplitude adjustment and the phase adjustment of the voltage occurring at the screen grids of the control-amplifying valves 11, 12 may be achieved independently of each other in a simple manner by connecting a damping resistor 34 in parallel with the circuit 32, 33 and by detuning the circuit 31 by means of the circuit capacitor 33. For this purpose the tuned circuit 31 must have a capacitive reactance for the second-order intermodulation products, so that the tuning frequency of the circuit 31 is 5% to 20% lower than twice the frequency of the transmitted single sideband signals.

Thus by utilizing the second-order distortion products lying in the band of twice the frequency of the transmitted single sideband signals lying completely outside the frequency band to be transmitted, an effective compensation of the disturbing third-order intermodulation products is obtained. With the 10 kw. transmitter shown the interfering third-order intermodulation products were attenuated to a value better than 45 db.

An important additional advantage of the measure described above resides in the inflexibility. It is advantageous to use the invention in a single sideband transmitter with adjustable frequency, in which case the circuit may be made adjustable continuously or stepwise. If a smaller compensation of the interfering third-order intermodulation products, for example of about 35 db is permissible, it is sufficient to use a circuit 31 with fixed tuning in wide frequency ranges, for example from 10 to 15 mc./s.

It should finally be noted that apart from the embodiment shown in figure further embodiments are possible within the scope of the invention. The selective circuit may, for example, be included in the anode circuit or the cathode circuit of the control-amplifying stage or in a current-conveying electrode circuit of the output amplifier.

What is claimed is:

1. An amplifier for single-sideband signals comprising an amplifying device having an input electrode and second and third electrodes, a source of operating potential, means connecting said source of operating potential between said second and third electrodes, a source of single-sideband signals connected to said input electrode whereby current flow in said device between said second and third electrodes varies as a function of said signals, and means for compensating for third-order intermodulation currents in said amplifier comprising resonant circuit means tuned to a frequency higher than said single-sideband signals and connected to said device for shifting the phase of second-order distortion currents in said device whereby said signals mix with said phase shifted second-order distortion currents in said device to provide currents substantially cancelling said third-order intermodulation currents.

2. An amplifier for single-sideband signals comprising an electron discharge device having at least a control grid, a cathode and an anode, a source of operating potential, means connecting said source of operating potential between said cathode and said anode, output circuit means connected to said anode, a source of single-sideband signals connected to said control grid, and means for compensating for third-order intermodulation currents in said device comprising resonant circuit means tuned to a frequency higher than said single-sideband signals and connected to said device for shifting the phase of second-order distortion currents in said device whereby said signals mix with said phase shifted second-order distortion currents in said device to provide frequency components for substantially cancelling said third-order intermodulation currents.

3. An amplifier for single-sideband signals comprising an electron discharge device having at least a cathode, a control grid, a screen grid and an anode, in that order, a source of single-sideband signals connected to said control grid, output circuit means connected to said anode, a source of operating voltage for said screen grid, phase shifting resonant circuit network means having a resonant frequency in the range of 5–20 percent below twice the frequency of said single-sideband signals, and means serially connecting said network and source of voltage between said screen grid and cathode, said network being tuned to shift the phase of second-order distortion products whereby said signals mix with said phase shifted second-order distortion products in said device to substantially cancel third-order intermodulation products.

4. The amplifier of claim 3, in which said network comprises a parallel resonant circuit detuned with respect to the frequency of said second-order distortion products.

5. The amplifier of claim 4, in which a damping resistor is connected in parallel with said resonant circuit.

6. An amplifier for single-sideband signals comprising first and second electron discharge devices each having at least a cathode, a control grid, a screen grid and an anode, in the order named, a source of push-pull single-sideband signals connected between the control grids of said first and second devices, a push-pull output circuit connected between the anodes of said first and second devices, a source of operating voltage for said screen grids, and common parallel resonant circuit means tuned to a frequency higher than said single-sideband signals for connecting said screen grids to said source of operating voltage, said resonant circuit means being detuned with respect to second-order distortion products of said signals to shift the phase of said second-order distortion products at said screen grids, whereby said signals and second-order distortion products mix in said devices to substantially cancel third-order intermodulation products.

References Cited by the Examiner

UNITED STATES PATENTS

| | | | |
|---|---|---|---|
| 2,231,863 | 2/41 | Clay | 330—120 X |
| 2,833,991 | 5/58 | Karstad | 332—37 X |
| 2,968,006 | 1/61 | Bachman | 330—123 |
| 3,116,461 | 12/63 | Green | 330—111 X |

ROY LAKE, *Primary Examiner.*

ARTHUR GAUSS, *Examiner.*